(12) United States Patent
Martin

(10) Patent No.: US 9,344,505 B1
(45) Date of Patent: May 17, 2016

(54) TRANSFERRING COOKIE DATA TO ANOTHER DOMAIN

(75) Inventor: Bobby D. Martin, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1248 days.

(21) Appl. No.: 13/237,597

(22) Filed: Sep. 20, 2011

(51) Int. Cl.
 *H04L 29/08* (2006.01)
 *H04L 12/24* (2006.01)
(52) U.S. Cl.
 CPC .......... *H04L 67/146* (2013.01); *H04L 41/0246* (2013.01)
(58) Field of Classification Search
 CPC ................ H04L 41/0246; H04L 67/146
 USPC .......................................... 709/203
 See application file for complete search history.

(56) References Cited

U.S. PATENT DOCUMENTS

| 7,103,714 | B1* | 9/2006 | Jacobs et al. ............... 711/113 |
| 7,454,761 | B1* | 11/2008 | Roberts et al. ............. 719/318 |
| 2004/0044731 | A1* | 3/2004 | Chen et al. ................. 709/203 |
| 2007/0271375 | A1* | 11/2007 | Hwang ....................... 709/224 |
| 2010/0153544 | A1* | 6/2010 | Krassner et al. ........... 709/224 |
| 2011/0239138 | A1* | 9/2011 | Galushka et al. .......... 715/760 |
| 2013/0055309 | A1* | 2/2013 | Dittus ......................... 725/35 |

* cited by examiner

*Primary Examiner* — Asad Nawaz
*Assistant Examiner* — Saad A Waqas
(74) *Attorney, Agent, or Firm* — Thomas | Horstemeyer, LLP

(57) ABSTRACT

Disclosed are various embodiments for transferring cookie data between different domains. A first network data request is obtained from a client through a first domain. The first network data request includes a first cookie set by the first domain. Data from the first cookie is stored in a cache in association with a unique identifier. A second network data request, which presents the unique identifier, is obtained from the client through a second domain. A second cookie is set in the client through the second domain based at least in part on data from the first cookie. The first cookie is inaccessible to the second domain.

21 Claims, 5 Drawing Sheets

TRANSFERRING COOKIE DATA TO ANOTHER DOMAIN

BACKGROUND

A cookie corresponds to data stored by a browser on the computing device of a user on behalf of a network site. The cookie is stored by the network site and may be read back by the same network site. The behavior of browsers with respect to cookies is standardized. For security reasons, cookies set by a network site under one domain can be read back only by network sites under that domain.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to transferring cookie data from one domain to another. Cookies correspond to name-value parameter data that is stored by the browser and presented to qualifying network sites. Cookies, as used in hypertext transfer protocol (HTTP), are specified with a domain attribute. The domain attribute controls which network sites will be presented with the cookie by the browser. For example, suppose that a user requests a network page at the uniform resource locator (URL) "http://www.foo.com." After the browser submits the HTTP get request, the network site may respond with a directive to set a cookie, for example, set the attribute "color" to be the value "green." The network site may also set the domain attribute to be "foo.com."

Accordingly, only network sites associated with "foo.com" or its subdomains (e.g., "www.foo.com," "www2.foo.com," etc.) will have future access to the cookie. When the user later revisits "www.foo.com," the browser automatically presents the network site with the cookie that defines "color" to be "green." However, network pages are often made up with components from multiple network sites, and it may be desirable to share cookie information between different domains.

Various embodiments of the present disclosure facilitate transfer of cookie data between different domains by way of a cookie transfer service that is accessible under both of the domains. The network page is configured to call the cookie transfer service under both of the domains, thereby providing the service with the cookies from the source domain in the first call and obtaining the cookies for the destination domain in the second call. In the following discussion, a general description of the system and its components is provided, followed by a discussion of the operation of the same.

Figure 1:
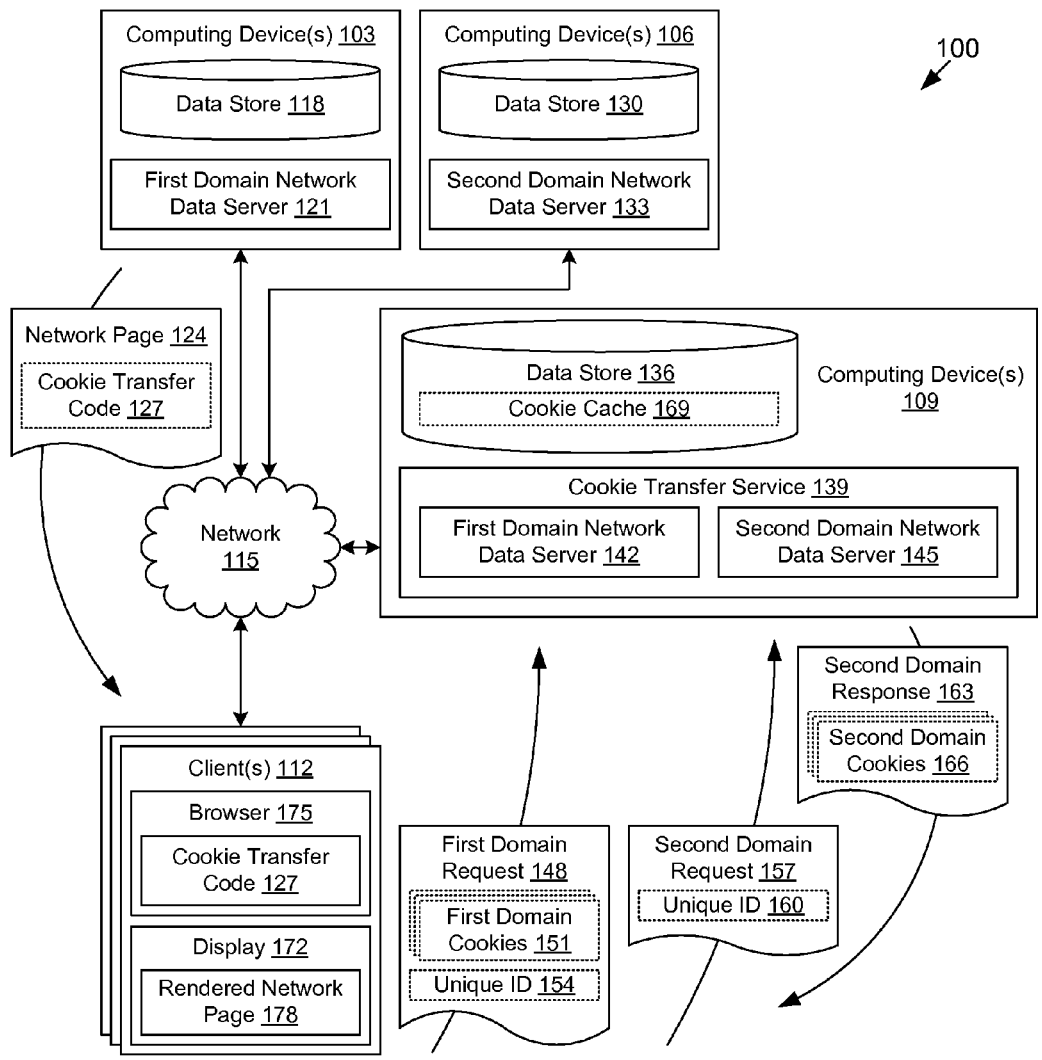
FIG. 1 is a drawing of a networked environment according to various embodiments of the present disclosure.

With reference to FIG. 1, shown is a networked environment 100 according to various embodiments. The networked environment 100 includes one or more computing devices 103, one or more computing devices 106, one or more computing devices 109, and one or more clients 112 in data communication by way of a network 115. The network 115 includes, for example, the Internet, intranets, extranets, wide area networks (WANs), local area networks (LANs), wired networks, wireless networks, or other suitable networks, etc., or any combination of two or more such networks.

The computing devices 103, 106, and 109 may each comprise, for example, a server computer or any other system providing computing capability. Alternatively, a plurality of computing devices 103, 106, and 109 may be employed that are arranged, for example, in one or more server banks or computer banks or other arrangements. For example, a plurality of computing devices 103, 106, and 109 together may comprise a cloud computing resource, a grid computing resource, and/or any other distributed computing arrangement. Such computing devices 103, 106, and 109 may be located in a single installation or may be distributed among many different geographical locations. For purposes of convenience, each computing device 103, 106, and 109 is referred to herein in the singular. Even though the computing device 103, 106, and 109 is referred to in the singular, it is understood that a plurality of computing devices 103, 106, and 109 may be employed in the various arrangements as described above. Furthermore, in some embodiments, the computing devices 103, 106, and/or 109 may correspond to the same computing device.

Various applications and/or other functionality may be executed in the computing device 103 according to various embodiments. Also, various data is stored in a data store 118 that is accessible to the computing device 103. The data store 118 may be representative of a plurality of data stores 118 as can be appreciated. The data stored in the data store 118, for example, is associated with the operation of the various applications and/or functional entities described below.

The components executed on the computing device 103, for example, include a first domain network data server 121 and other applications, services, processes, systems, engines, or functionality not discussed in detail herein. The first domain network data server 121 corresponds to a server application that is configured to generate and serve up network pages 124, such as web pages, gopher pages, and/or other forms of network content. The network page 124 may include cookie transfer code 127 that is configured to transfer cookies from one domain to another. The cookie transfer code 127 may correspond to one or more requests for visible objects, invisible objects (e.g., 1×1 pixel transparent graphics interchange format (GIF) files, etc.) and/or client-side executable code such as JavaScript, asynchronous JavaScript (Ajax), and other forms of code configured to implement a cookie transfer.

The first domain network data server 121 is configured to be accessed through a first domain, such as, for example, "foo.com," "www.foo.com," etc. To this end, the first domain network data server 121 may correspond to a virtual host or an actual host for an internet protocol (IP) address associated with the first domain. Accordingly, uniform resource locators (URLs) such as "http://www.foo.com/index.html" which include the first domain may be used to access content through the first domain network data server 121. In various embodiments, the first domain network data server 121 may correspond to a commercially available HTTP server such as Apache® HTTP Server, Apache® Tomcat®, Microsoft® Internet Information Services (IIS), and so on.

Various applications and/or other functionality may be executed in the computing device 106 according to various embodiments. Also, various data is stored in a data store 130 that is accessible to the computing device 106. The data store 130 may be representative of a plurality of data stores 130 as can be appreciated. The data stored in the data store 130, for example, is associated with the operation of the various applications and/or functional entities described below.

The components executed on the computing device 106, for example, include a second domain network data server 133 and other applications, services, processes, systems, engines, or functionality not discussed in detail herein. The second domain network data server 133 corresponds to a server application that is configured to generate and serve up network pages 124 or portions of network pages 124. The second domain network data server 133 is configured to be accessed through a second domain which is different from the first domain, such as, for example, "bar.com," "www.bar.com," etc.

To this end, the second domain network data server 133 may correspond to a virtual host or an actual host for an IP address associated with the second domain. Accordingly, URLs such as "http://www.bar.com/index.html" which include the second domain may be used to access content through the second domain network data server 133. In various embodiments, the second domain network data server 133 may correspond to a commercially available HTTP server such as Apache® HTTP Server, Apache® Tomcat®, Microsoft® IIS, and so on.

Various applications and/or other functionality may be executed in the computing device 109 according to various embodiments. Also, various data is stored in a data store 136 that is accessible to the computing device 109. The data store 136 may be representative of a plurality of data stores 136 as can be appreciated. The data stored in the data store 136, for example, is associated with the operation of the various applications and/or functional entities described below.

The components executed on the computing device 109, for example, include a cookie transfer service 139 and other applications, services, processes, systems, engines, or functionality not discussed in detail herein. The cookie transfer service 139 is executed to facilitate a transfer of cookie data from the first domain to the second domain. To this end, the cookie transfer service 139 may incorporate a first domain network data server 142 and a second domain network data server 145, which may the same as or different from the first domain network data server 121 and/or the second domain network data server 133.

In one embodiment, the first domain network data server 142 is addressed by a subdomain of the first domain, e.g., "cookie-transfer.foo.com," etc. Likewise, in one embodiment, the second domain network data server 145 is addressed by a subdomain of the second domain, e.g., "cookie-transfer.bar.com," etc. In one embodiment, the first domain network data server 142 and the second domain network data server 145 may correspond to two virtual hosts on a unitary network data server. Thus, it may be the case that "cookie-transfer.bar.com" is in fact operated by the entity behind "foo.com" even though "bar.com" is not. In one embodiment, the first domain network data server 142 and the second domain network data server 145 shares a single internet protocol (IP) address or other address on the network 115. The cookie transfer service 139 may be configured to distinguish requests destined for the first domain network data server 142 or the second domain network data server 145 by way of information in the request header such as path information or other data. In various embodiments, the first domain network data server 142 and/or the second domain network data server 145 may correspond to a commercially available HTTP server such as Apache® HTTP Server, Apache® Tomcat®, Microsoft® IIS, and so on.

The first domain network data server 142 is configured to obtain first domain requests 148 from the clients 112, which may each include first domain cookies 151 and a unique identifier 154. The first domain cookies 151 may be, for example, first party cookies set by some server in the first domain. The first domain cookies 151 are inaccessible to servers in the second domain. The second domain network data server 145 is configured to obtain second domain requests 157 from the clients 112, which include a respective unique identifier 160. In response, the second domain network data server 145 is configured to send second domain responses 163 including second domain cookies 166 back to the clients 112. The second domain cookies 166 may correspond to first party cookies in one embodiment. In one embodiment, the second domain cookies 166 are inaccessible by servers under the first domain. However, in another embodiment, the second domain cookies 166 may be accessed by one or more servers under the first domain.

The data stored in the data store 136 includes, for example, a cookie cache 169 and potentially other data. The cookie cache 169 is employed to store data from the first domain cookies 151 in association with unique identifiers 154 for use in generating the second domain cookies 166. In one embodiment, the cookie cache 169 may be configured to track the time at which the cookie data was stored, or the sequence in which the cookie data was stored, for use in cached data expiration and purging.

The client 112 is representative of a plurality of client devices that may be coupled to the network 115. The client 112 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 112 may include a display 172. The display 172 may comprise, for example, one or more devices such as cathode ray tubes (CRTs), liquid crystal display (LCD) screens, gas plasma-based flat panel displays, LCD projectors, or other types of display devices, etc.

The client 112 may be configured to execute various applications such as a browser 175 and/or other applications. The browser 175 may be executed in a client 112, for example, to access and render network pages 124, such as web pages, or other network content served up by the computing device 103, 106, 109, and/or other servers, thereby generating a rendered network page 178 on the display 172. The browser 175 may be further configured by the network page 124 to execute the cookie transfer code 127. The client 112 may be configured to execute applications beyond browser 175 such as, for example, mobile applications, email applications, instant message applications, and/or other applications.

Next, a general description of the operation of the various components of the networked environment 100 is provided. To begin, a user may use the browser 175 to engage in interactions with the first domain network data server 121 over time. Consequently, cookies may be set by the first domain network data server 121 in the browser 175. These cookies may be associated with further information about the user which is stored in the data store 118.

The user may request a network page 124 from the first domain network data server 121 which includes a portion that is generated by the second domain network data server 133. For various reasons, the second domain network data server 133 may want to access the cookies set by the first domain network data server 121. However, such cookies are set as first-party cookies under the first domain and can only be read by that domain or subdomains of that domain.

To facilitate a transfer of the cookie data, the network page 124 includes cookie transfer code 127. The cookie transfer code 127 is configured to make at least two network data requests, one to a server under the first domain, and the other to a server under the second domain. The servers are operated under the auspices of cookie transfer service 139. In one scenario, the servers are operated by the entity that controls the first domain. In another scenario, the servers are operated by the entity that controls the second domain. In yet another scenario, the servers are operated by a third-party independent entity.

The requests may correspond to HTTP requests such as "get" requests, "post" requests, and/or any other request by which cookies may be read or set by a server. In one embodiment, one or more of the requests may correspond to invisible objects, such as transparent images or other invisible objects. In another embodiment, one or more of the requests may be made by JavaScript, VBScript, Ajax, or other client-side scripting technology.

The initial request, the first domain request 148, is used to input the cookies under the first domain to the cookie transfer service 139. To this end, the first domain request 148 is made to the first domain network data server 142 which may be a subdomain of the first domain. The browser 175 is configured to present the first domain cookies 151 to the first domain network data server 142 automatically.

In some cases, the cookie transfer code 127 may configure the browser 175 to generate a unique identifier 154. The unique identifier 154, for example, may correspond to a 64-bit or larger random number that may be considered to be unique. Other locally available information (network 115 address, media access control (MAC) address, user identifier, etc.) may be used in generating a unique identifier 154. In order to prevent unauthorized access to the cookie information, the unique identifier 154 may be selected such that it is not easily or practically derivable by a third party.

The unique identifier 154 may be presented to the first domain network data server 142 along with the first domain request 148. Alternatively, the unique identifier 154 may be generated by the cookie transfer service 139 and returned to the client 112 in a response to the first domain request 148. The cookie transfer service 139 records some or all of the data from the first domain cookies 151 in the cookie cache 169, in association with the unique identifier 154. In some cases, additional data from the data store 118 may be obtained and also stored in association with the unique identifier 154.

The browser 175 then makes a second domain request 157 to the second domain network data server 145 which corresponds to the second domain, or destination domain, to where the cookie data is to be transferred. The browser 175 presents the unique identifier 160 (corresponding to the unique identifier 154) in the second domain request 157. The second domain network data server 145 is addressed under the second domain or a subdomain thereof. In response to the second domain request 157, the cookie transfer service 139 loads the data from the first domain cookies 151 from the cookie cache 169 using the unique identifier 160.

The second domain network data server 145 then sends a second domain response 163 back to the browser 175. The second domain response 163 includes one or more second domain cookies 166, which are set to be readable under the second domain, which may be a parent domain of the domain used to address the second domain network data server. For example, if the second domain network data server 145 is addressed under "cookie-transfer.bar.com," the second domain cookies 166 may be set to be readable by "bar.com."

The data in the second domain cookies 166 corresponds to, or is derived from, the first domain cookies 151. It may be possible that the data in the second domain cookies 166 is entirely different from the data in the first domain cookies 151. As a non-limiting example, the data in the first domain cookies 151 may specify a value of "1024." This value may correspond to a string of "123 Anywhere Drive" in the data store 118. In the corresponding second domain cookie, the value "8192" may be set, which may correspond to the string "123 Anywhere Drive" in the data store 130.

It is noted that the cookie transfer service 139 may apply various transformations to the cookie data. In addition, some information from the first domain cookies 151 may be configured not to be transferred to the second domain cookies 166. Because the first domain and the second domain may be operated by separate entities, it may be desirable not to transfer all the information to the other entity.

After the second domain cookies 166 are set, the browser 175 may request data from the second domain network data server 133 for rendering the other portion of the network page 124. In the request to the second domain network data server 133, the second domain cookies 166 are presented. While the specific example of a portion of the network page 124 originating from another domain is discussed, it is understood that the cookie transfer service 139 may be used to transfer cookies for other reasons, including sharing user state data across multiple network pages 124. It is noted that the portion of the network page 124 may include the cookie transfer code 127 and may be configured to initiate the cookie transfer in some embodiments. Also, it is noted that the cookie transfer service 139 may function bidirectionally so that cookies from the second domain may be set in the first domain as well according to the principles of the present disclosure.

Since the cookie cache 169 is used for the purpose of transferring cookies, the corresponding data in the cookie cache 169 may be purged relative to the transfer being consummated. In addition, time and/or sequences recorded in the cookie cache 169 may be used to effect purging after a certain time period even if the transfer is not consummated. Purging the cookie cache 169 and/or preventing cookie transfer following a predefined time period after an inchoate cookie transfer (e.g. after merely a first domain request 148, etc.) may provide enhanced security.

Figure 2:
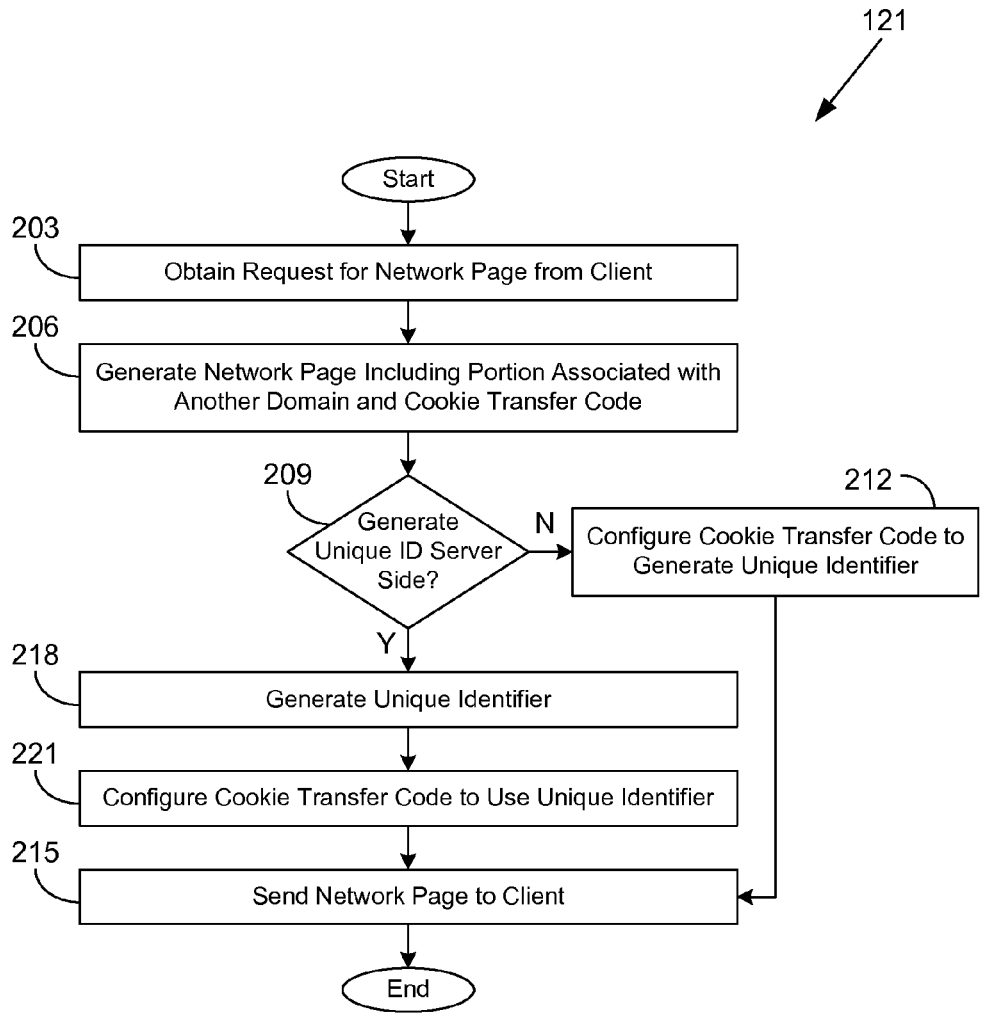
FIG. 2 is a flowchart illustrating one example of functionality implemented as portions of a network data server executed in a computing device in the networked environment of FIG. 1 according to various embodiments of the present disclosure.

Referring next to FIG. 2, shown is a flowchart that provides one example of the operation of a portion of the first domain network data server 121 according to various embodiments. It is understood that the flowchart of FIG. 2 provides merely an example of the many different types of functional arrangements that may be employed to implement the operation of the portion of the first domain network data server 121 as described herein. As an alternative, the flowchart of FIG. 2 may be viewed as depicting an example of steps of a method implemented in the computing device 103 (FIG. 1) according to one or more embodiments.

Beginning with box 203, the first domain network data server 121 obtains a request for a network page 124 (FIG. 1) from a client 112 (FIG. 1). In box 206, the first domain network data server 121 generates the network page 124. The network page 124 includes a portion that is associated with another domain. The network page 124 also includes cookie transfer code 127 (FIG. 1).

In box 209, the first domain network data server 121 determines whether a unique identifier 154 (FIG. 1) is to be generated server-side. If a unique identifier 154 is not to be generated server-side, the first domain network data server 121 proceeds to box 212 and configures the cookie transfer code 127 to generate the unique identifier 154 client-side. The first domain network data server 121 then sends the network page 124 to the client 112 in box 215. Thereafter, the portion of the first domain network data server 121 ends.

If, instead, the first domain network data server 121 determines in box 209 that the unique identifier 154 is to be generated server-side, the first domain network data server 121 proceeds from box 209 to box 218. In box 218, the first domain network data server 121 generates the unique identifier 154. In box 221, the first domain network data server 121 configures the cookie transfer code 127 to use the unique identifier 154. In box 215, the first domain network data server 121 sends the network page 124 to the client 112. Thereafter, the portion of the first domain network data server 121 ends.

Figure 3:
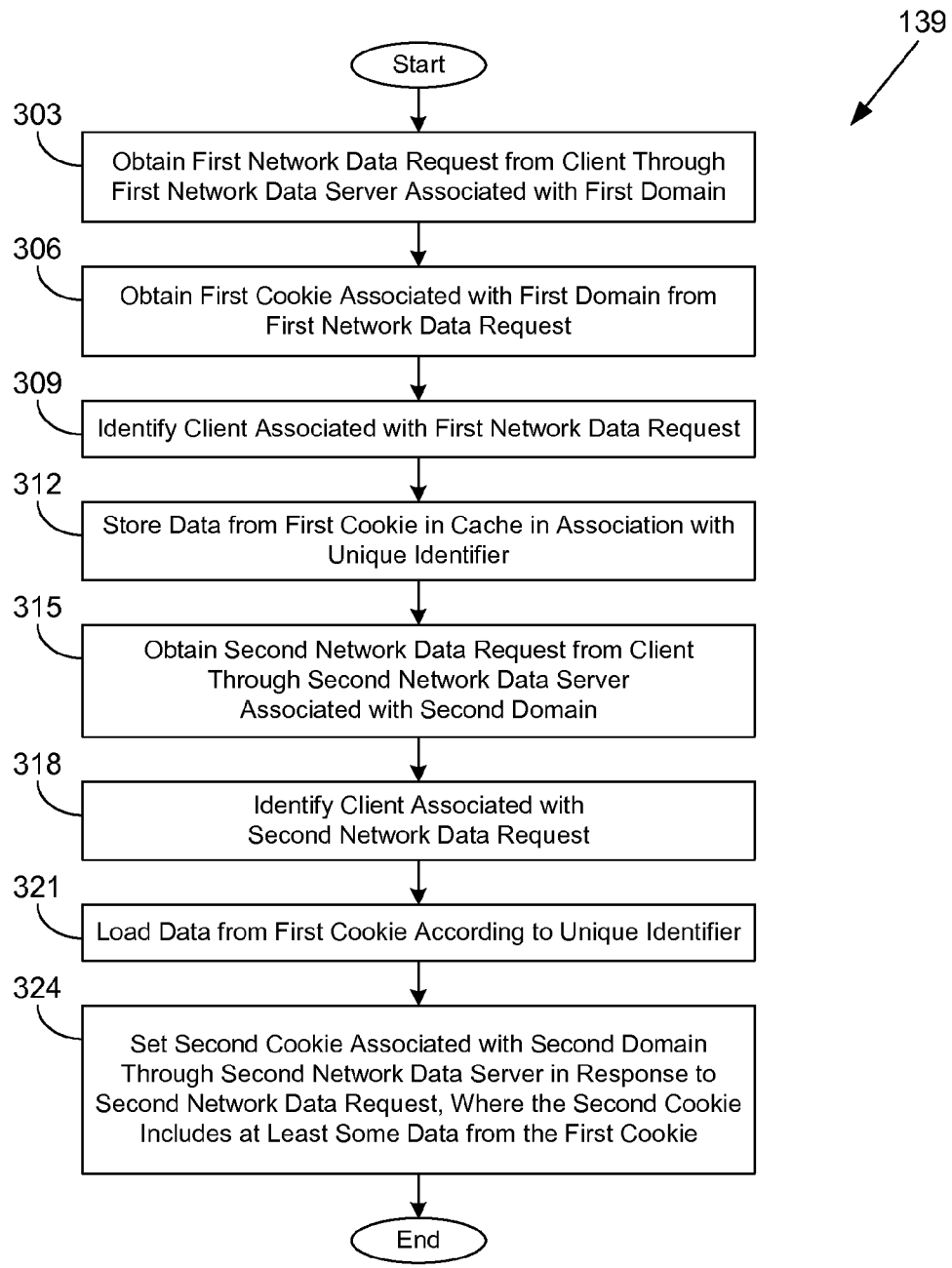
FIG. 3 is a flowchart illustrating one example of functionality implemented as portions of a cookie transfer service executed in a computing device in the networked environment of FIG. 1 according to various embodiments of the present disclosure.

Turning now to FIG. 3, shown is a flowchart that provides one example of the operation of a portion of the cookie transfer service 139 according to various embodiments. It is understood that the flowchart of FIG. 3 provides merely an example of the many different types of functional arrangements that may be employed to implement the operation of the portion of the cookie transfer service 139 as described herein. As an alternative, the flowchart of FIG. 3 may be viewed as depicting an example of steps of a method implemented in the computing device 109 (FIG. 1) according to one or more embodiments.

Beginning with box 303, the cookie transfer service 139 obtains a first domain request 148 (FIG. 1) from a client 112 (FIG. 1) through the first domain network data server 142 (FIG. 1). In box 306, the cookie transfer service 139 obtains one or more first domain cookies 151 (FIG. 1) from the first domain request 148. In box 309, the cookie transfer service 139 identifies the client 112 associated with the first domain request 148. For example, the client 112 may be identified by a unique identifier 154 (FIG. 1) presented in the first domain request 148. Alternatively, the client 112 may be identified by an IP address, a session identifier, and/or other data.

In box 312, the cookie transfer service 139 stores data from the first domain cookies 151 in the cookie cache 169 (FIG. 1). The first domain cookies 151 are stored in association with a unique identifier 154 or other information used to identify the client 112. In box 315, the cookie transfer service 139 obtains a second domain request 157 (FIG. 1) from the client 112 through the second domain network data server 145 (FIG. 1). It is noted that the second domain request 157 may be obtained before the tasks of boxes 303-312 are completed. If so, an HTTP connection associated with the second domain request 157 may remain in an open state for a time period such that the client 112 waits for data on the second domain request 157.

In box 318, the cookie transfer service 139 identifies the client 112 associated with the second domain request 157. For example, the cookie transfer service 139 may identify the client 112 by way of a unique identifier 160 (FIG. 1) presented with the second domain request 157. In box 321, the cookie transfer service 139 loads data from the first domain cookies 151 from the cookie cache 169 using the unique identifier 160. In box 324, the cookie transfer service 139 sets one or more second domain cookies 166 (FIG. 1) in a second domain response 163 (FIG. 1) to the second domain request 157. The second domain cookies 166 include at least some data from the first domain cookies 151. Thereafter, the portion of the cookie transfer service 139 ends.

Figure 4:
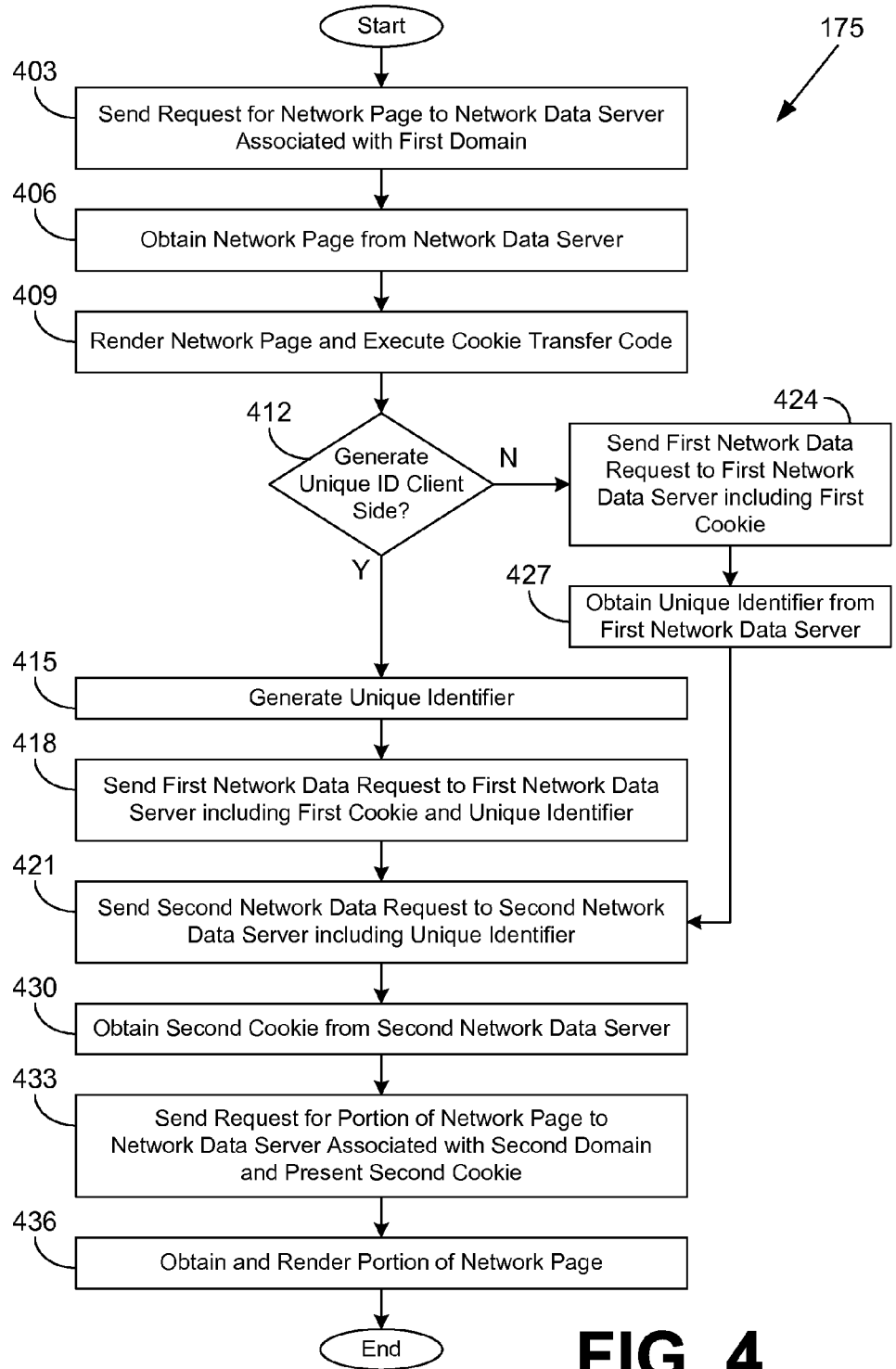
FIG. 4 is a flowchart illustrating one example of functionality implemented as portions of a browser executed in a client in the networked environment of FIG. 1 according to various embodiments of the present disclosure.

Moving on to FIG. 4, shown is a flowchart that provides one example of the operation of a portion of the browser 175 according to various embodiments. It is understood that the flowchart of FIG. 4 provides merely an example of the many different types of functional arrangements that may be employed to implement the operation of the portion of the browser 175 as described herein. Portions of the tasks described as performed by the browser 175 may be performed by cookie transfer code 127 (FIG. 1) executed in the browser 175. As an alternative, the flowchart of FIG. 4 may be viewed as depicting an example of steps of a method implemented in the client 112 (FIG. 1) according to one or more embodiments.

Beginning with box 403, the browser 175 sends a request for a network page 124 (FIG. 1) to a first domain network data server 121 (FIG. 1). In box 406, the browser 175 obtains the network page 124 from the first domain network data server 121. In box 409, the browser 175 renders the network page 124 as the rendered network page 178 (FIG. 1) on the display 172 (FIG. 1). The browser 175 also executes the cookie transfer code 127 in the network page 124.

In box 412, the browser 175 determines whether a unique identifier 154 (FIG. 1) is to be generated client-side. If a unique identifier 154 is to be generated client-side, the browser 175 moves to box 415 and generates the unique identifier 154. In box 418, the browser 175 sends a first domain request 148 (FIG. 1) to the first domain network data server 142 (FIG. 1). The first domain request 148 includes one or more first domain cookies 151 (FIG. 1) and the unique identifier 154 generated in the client 112. The browser 175 proceeds to box 421.

If the browser 175 instead determines in box 412 that the unique identifier 154 is not to be generated client-side, the browser 175 moves from box 412 to box 424. In box 424, the browser 175 sends the first domain request 148 to the first domain network data server 142. The first domain request 151 includes one or more first domain cookies 151. In box 427, the browser 175 obtains a unique identifier 154 from the first domain network data server 142 in response to the first domain request 148. The browser 175 then transitions to box 421.

In box 421, the browser 175 sends a second domain request 157 (FIG. 1) to the second domain network data server 145 (FIG. 1). The second domain request 157 includes a unique identifier 160 (FIG. 1) corresponding to the unique identifier 154. In box 430, the browser 175 obtains a second domain response 163 (FIG. 1) from the second domain network data server 145 which includes one or more second domain cookies 166 (FIG. 1). The browser 175 may then store the second domain cookies 166.

In box 433, the browser 175 sends a request for a portion of the network page 124 to the second domain network data server 133. In the request, the browser 175 presents the second domain cookies 166. In box 436, the browser 175 obtains the portion of the network page 124 from the second domain network data server 133. The browser 175 also renders the portion in the rendered network page 178. Thereafter, the portion of the browser 175 ends.

Figure 5:
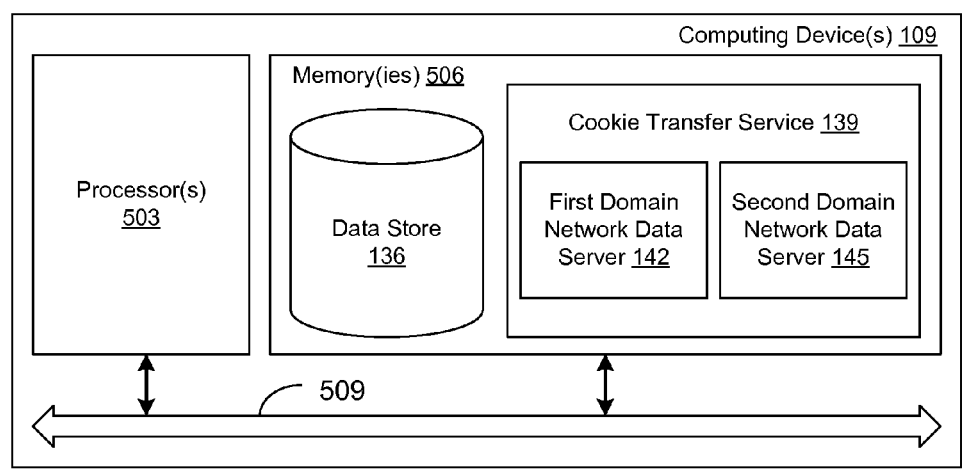
FIG. 5 is a schematic block diagram that provides one example illustration of a computing device employed in the networked environment of FIG. 1 according to various embodiments of the present disclosure.

With reference to FIG. 5, shown is a schematic block diagram of the computing device 109 according to an embodiment of the present disclosure. The computing device 109 includes at least one processor circuit, for example, having a processor 503 and a memory 506, both of which are coupled to a local interface 509. To this end, the computing device 109 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the cookie transfer service 139, the first domain network data server 142, the second domain network data server 145, and potentially other applications. Also stored in the memory 506 may be a data store 136 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the cookie transfer service 139, the first domain network data server 142, the second domain network data server 145, the first domain network data server 121 (FIG. 1), the second domain network data server 133 (FIG. 1), the cookie transfer code 127 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2-4 show the functionality and operation of an implementation of portions of the first domain network data server 121, the cookie transfer service 139, and the browser 175 (FIG. 1). If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 2-4 show a specific order of execution, it is understood that the order of execution may differ from that which is depicted. For example, the order of execution of two or more blocks may be scrambled relative to the order shown. Also, two or more blocks shown in succession in FIGS. 2-4 may be executed concurrently or with partial concurrence. Further, in some embodiments, one or more of the blocks shown in FIGS. 2-4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the cookie transfer service 139, the first domain network data server 142, the second domain network data server 145, the first domain network data server 121, the second domain network data server 133, and the cookie transfer code 127, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program that, when executed by at least one computing device, causes the at least one computing device to at least:
    set a first cookie associated with a first domain in a client;
    generate a network page subsequent to setting the first cookie, the network page including a first portion associated with the first domain and a second portion associated with a second domain, the network page further including:
    code that generates a unique identifier in the client;
        code that sends a first network data request from the client to a first server associated with the first domain, the first network data request presenting the unique identifier and data from the first cookie;
        code that sends a second network data request from the client to a second server associated with the second domain, the second network data request presenting the unique identifier and excluding the data from the first cookie; and
        code that, in response to receiving a response to the second network data request from the second server, saves a second cookie associated with the second domain, the second cookie containing the data from the first cookie;
    send the network page to the client;
    receive the data from the first cookie in response to the first network data request;
    correlate the first network data request with the second network data request based at least in part on the unique identifier;
    generate the second cookie based at least in part on the data from the first cookie, wherein the first cookie is inaccessible to the second server;
    determine that an expiration time period has elapsed relative to the first network data request being received; and
    purge the data from the first cookie in response to determining that the expiration time period has elapsed.

2. The non-transitory computer-readable medium of claim 1, wherein the first cookie and the second cookie are first party cookies.

3. A system, comprising:
    a data store; and
    at least one computing device in communication with the data store, the at least one computing device being configured to at least:
        set a first cookie associated with a first domain;
        receive a first network data request from a client through the first domain, the first network data request presenting the first cookie and a unique identifier, the unique identifier being generated subsequent to setting of the first cookie;
        receive a second network data request from the client through a second domain, the second network data request presenting the unique identifier from the first network data request and excluding data from the first cookie;
        set a second cookie derived from at least some data from the first cookie on the client through the second domain in response to the second network data request, wherein the first domain is hosted by a first network data server, and the second domain is hosted by a second network data server;
        determine that an expiration time period has elapsed relative to the first network data request being received; and
        purge the data from the first cookie in response to determining that the expiration time period has elapsed.

4. The system of claim 3, wherein the first network data server and the second network data server each correspond to a respective virtual server hosted by a unitary network data server application executable in the at least one computing device.

5. The system of claim 3, wherein the first cookie on the client is inaccessible to the second network data server.

6. The system of claim 3, wherein the second cookie on the client is inaccessible to the first network data server.

7. The system of claim 3, wherein the first network data server is executable in the at least one computing device, and the at least one computing device being further configured to at least:
    generate a network page, the network page, when executed by at least one client computing device, causes the at least one client computing device to at least generate the first network data request and generate the second network data request, at least a portion of the network page depending on data received from a server associated with the second domain; and
    send the network page to the client.

8. The system of claim 7, wherein the network page further causes the at least one client computing device to at least generate the unique identifier.

9. The system of claim 7, wherein the first network data request and the second network data request each correspond to a respective invisible object in the network page.

10. The system of claim 7, wherein the first network data request and the second network data request each correspond to a respective asynchronous JavaScript (Ajax) call.

11. A method comprising:
sending, via at least one of one or more computing devices, a request configured to set a first cookie that is associated with a first domain in a client;
receiving, via at least one of the one or more computing devices, a first network data request from the client through the first domain, the first network data request including the first cookie set by the first domain and a unique identifier, the unique identifier being generated subsequent to setting of the first cookie;
storing, via at least one of the one or more computing devices, data from the first cookie in a cache in association with the unique identifier;
receiving, via at least one of the one or more computing devices, a second network data request from the client through a second domain, the second network data request presenting the unique identifier and excluding the data from the first cookie;
setting, via at least one of the one or more computing devices, a second cookie in the client through the second domain based at least in part on the data from the first cookie, wherein the first cookie is inaccessible to the second domain;
determining, via at least one of the one or more computing devices, that an expiration time period has elapsed relative to the first network data request being received; and
purging, via at least one of the one or more computing devices, the data from the first cookie from the cache in response to determining that the expiration time period has elapsed.

12. The method of claim 11, wherein the second cookie is inaccessible to the first domain.

13. The method of claim 11, wherein the unique identifier is generated in the client and presented to at least one or more of the one or more computing devices in the first network data request.

14. The method of claim 11, further comprising:
generating, via at least one of the one or more computing devices, the unique identifier in response to the first network data request; and
sending, via at least one of the one or more computing devices, the unique identifier to the client.

15. The method of claim 11, further comprising loading, via at least one of the one or more computing devices, the data from the first cookie from the cache in response to the second network data request based at least in part on the unique identifier presented in the second network data request.

16. The method of claim 11, wherein the first network data request and the second network data request are hypertext transfer protocol (HTTP) requests.

17. The method of claim 11, further comprising purging, via at least one of the one or more computing devices, the data from the first cookie from the cache in response to setting the second cookie being completed.

18. The method of claim 11, wherein the first network data request is received before the second network data request.

19. The method of claim 11, wherein the second network data request is received before the first network data request, and the method further comprises maintaining, via at least one of the one or more computing devices, a hypertext transfer protocol (HTTP) connection associated with the second network data request in an open state until at least after the first network data request is received, the second cookie being set through the HTTP connection after the first network data request is received.

20. The method of claim 11, wherein at least one of the one or more computing devices is operated by an entity associated with the first domain, and the second domain corresponds to a subdomain, also operated by the entity, of a third domain operated by another entity.

21. The method of claim 11, wherein at least one of the one or more computing devices is operated by a first entity, the first domain corresponds to a first subdomain, operated by the first entity, of a third domain operated by a second entity, and the second domain corresponds to a second subdomain, also operated by the first entity, of a fourth domain operated by a third entity.

* * * * *